May 11, 1971     H. TARIEL     3,578,541

THERMALLY INSULATED RECEPTABLE FOR A CRYOGENIC FLUID

Filed Dec. 16, 1966

INVENTOR
HENRI TARIEL
By Young & Thompson
ATTYS.

United States Patent Office 3,578,541
Patented May 11, 1971

3,578,541
THERMALLY INSULATED RECEPTABLE
FOR A CRYOGENIC FLUID
Henri Tariel, Grenoble, France, assignor to L'Air Liquide Anonyme pour L'Etude et l'Exploitation des Procedes Georges Claude
Filed Dec. 16, 1966, Ser. No. 602,324
Claims priority, application France, Nov. 2, 1966, 82,152
Int. Cl. B32b *3/26, 5/18;* B65d *81/38*
U.S. Cl. 161—7                                  3 Claims

ABSTRACT OF THE DISCLOSURE

Cryogenic insulation is provided, comprising Klegecell G300, which is foamed plastic formed from polyvinyl chloride, a copolymer of a vinylidene monomer and an ethylenically unsaturated carboxylic acid anhydride, and a polyisocyanate having at least two —N=C=O groups per molecule. It is impervious to atmospheric gases and thus protects the insulation. It can be used in combination with superinsulation, and can be covered with a protective and/or ablative coating.

---

Figure 1:
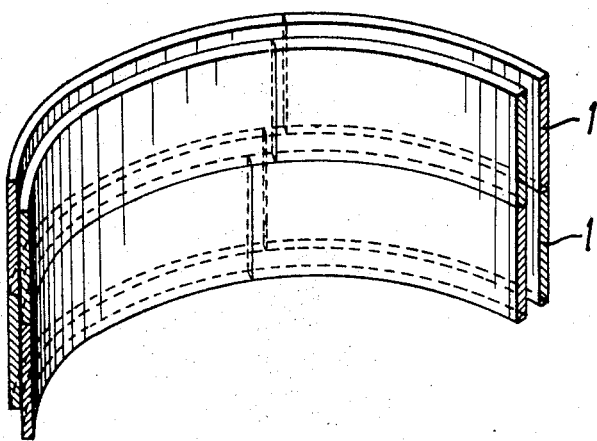

This invention relates to thermally insulated reservoirs, conduits and the like for cryogenic systems, more particularly for use in rockets, aircraft or space vehicles.

For simplicity, the term "apparatus" will be used hereinafter to mean any apparatus, including a reservoir or a conduit, which is adapted to contain or have passed therethrough a cryogenic system.

The main requirement of the thermal insulation of an apparatus for a cryogenic system particularly for space vehicles is that it should limit the heat, which is produced, for example, kinetically due to passage through the earth's atmosphere, entering the system. The insulating material employed to construct such an insulation must therefore have a low thermal conductivity and also be capable of withstanding thermal shock.

Many materials are presently employed to produce thermal insulation for apparatus of cryogenic systems. However, it is found that all the materials presently employed, although having in most cases the required thermal and mechanical properties, are attended by the appreciable disadvantage that they are more or less permeable to air and to constituents thereof. The thermal insulation should be completely impervious to the gases of the ambient atmosphere which are condensable at the temperature of the wall containing the cryogenic system, since the presence of such gases in the material constituting the thermal insulation reduces the insulating power of the material, and is even likely to cause destruction of the insulation by bursting due to the boiling of condensed gases when the incident heat flux is too great.

It is therefore necessary to provide a sealing skin around the insulation consisting of the insulating materials used heretofore in order to prevent cryopumping of the gases of the ambient atmospheres. The difficulty of applying sealing skins to awkwardly shaped apparatus or to surface junctions often results in poor fluid-tightness of the whole and thus in a deterioration of the insulating properties of the protection and, sometimes, in destruction of the insulation by bursting as mentioned above.

According to the present invention there is provided a process for thermally insulating cryogenic apparatus for a cryogenic system consisting in providing around the shell of the apparatus an insulating sheet formed from a gas-impermeable foamed plastics material.

Advantageously, the gas-impermeable foamed plastics material is formed from polyvinyl chloride, a copolymer of a vinylidene monomer and an ethylenically unsaturated carboxylic acid anhydride, and a polyisocyanate having at least two —N=C=O groups per molecule.

A rigid, cellular foam of polyvinyl chloride of the type which is advantageously used in the present invention is described in U.S. Pat. 3,200,089 and marketed under the name Klegecell G300. As a result of using insulation formed form Klegecell G300 the need for a sealing skin around the thermal insulation is no longer present.

The atmosphere of the cells enclosed in Klegecell G300 foam consists of a mixture of $CO_2$, air and a chlorofluoroalkane under a pressure of about 3 bars. Consequently, like all foams, it has excellent thermal insulating properties. Due to its three-dimensional structure, this material has good mechanical properties and high dimensional stability at moderately elevated temperatures. Moreover, this foam has proved to be impermeable to air and to its constituents both in intrinsic permeability tests on specimens, and in conductivity measurements of thermal insulation employed on reservoirs. This property renders very advantageous the use of the said rigid cellular foam in insulation of reservoirs for cryogenic systems for protecting them against temporary or permanent heat fluxes, in very varied applications such as reservoirs for liquid hydrogen and oxygen, methane containers, reservoirs for cryogenic fuels, storage containers, and piping or conduits for the transfer of cryogenic systems.

In the manufacture of an insulated apparatus in accordance with the invention, it is sufficient to attach an appropriate layer of the rigid, gas-impermeable cellular foam, for example Klegecell G300, to the rigid wall of, for example, a reservoir containing a cryogenic fluid in order to obtain an effective thermal insulation which is resistant to mechanical, thermal and aerodynamic stresses, without the thermal insulation having to be protected by a gas-impermeable skin. The only further protections which might be necessary around the layer of thermal insulation are a protective coating of high thermal capacity which is capable of taking up the temperature variations if the kinetic heat should become too great, or a protective coating of high mechanical quality which is capable of withstanding mechanical forces.

The rigid, gas-impermeable cellular foam may be applied to the inside as well as to the outside of the rigid shell of the apparatus to be insulated. The foam can be employed in thermal insulation of the super-insulation type for cryogenic stages whose function is to perform a phase of orbital flight for several hours. Such insulation, consisting of superinsulation, utilises the stratospheric vacuum and must be kept in an atmosphere of uncondensable gases when on the ground. The presence of a layer of 1 to 2 cm. of this type of rigid cellular foam disposed between a reservoir and the laminae of superinsulation makes it possible to replace the helium used for purging by nitrogen which is less conductive, less volatile and much less costly.

Figure 2:
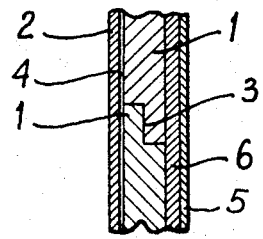

For a better understanding of the invention, and to show how the same may be carried into effect, reference will now be made, by way of example, to the accompanying drawing in which:

FIG. 1 illustrates the sleeve elements of a cryogenic fluid container, which are coated with panels of thermally insulating material; and FIG. 2 illustrates a detail of the positioning of the thermal insulation on the sleeve of the cryogenic fluid container.

The thermal insulation is formed from a rigid, cellular product known under the trade name Klegecell G300, the principal characteristics of which are as follows:

density: 55 g.l$^{-1}$
conductivity: 0.0065 w.m.$^{-1}$ deg. K.$^{-1}$ at 77° K.; 0.019 w.m.$^{-1}$ deg. K.$^{-1}$ at 300° K.
breaking load: 8.8 bars at 300° K.; 6.2 bars at 77° K.; 5.5 bars at 20° K.

The shell-form panels 1 of insulating material are produced from material in sheet form, the said panels having the curvature of the metal wall 2 of the container to be thermally insulated. The container can be, for example, a liquid-hydrogen reservoir of generally cylindrical shape having rounded ends. These panels 1 are assembled to form sleeve elements by adhesive bonding. The bonding in the rabbet joint is so effected as to ensure good fluid-tightness of the joint, not as a flat joint, but as a projecting joint, called a half-together joint 3. The sleeve elements are thereafter temporarily laid on the preheated cylindrical walls of the container so as to impress in the rigid cellular foam the local irregularities of the profile of the metal wall of the container to be insulated. When this so called "post forming" operation is neglected, poor bonding of the cellular foam to the metal wall may result. The bonding of the shells is thereafter effected by an adhesive 4 selected for its good mechanical properties in a desired temperature range, for example in the range of from 20° K. to 150° K. In this range the bonding can be effected using an adhesive of the polyurethane or epoxy type after vigorous cleaning of the metal shell of the container.

Preferably, the shell elements thus bonded to the metal wall of the receptacle are thereafter coated with an additional layer α of a material having a very high heat capacity which protects it against excessive heating due to the kinetic flux when passing through the atmosphere. Such a material can be, for example, a laminate consisting of a glass fabric coated with resin, a cork or, preferably, a so-called ablation material 5 which also serves, for the viewpoint of safety, to withstand violet mechanical forces such as impacts or vibrations.

Reservoirs for cryogenic systems insulated in accordance with the invention have undergone many cold cycles followed by flux simulation by infrared radiation. The insulating power of the thermal insulation which is 0.02 w.m.$^{-1}$° K.$^{-1}$ for a layer having a thicknes of 15 mm., was not impaired, and no degradation of the insulation panels or their assembly was observed after these tests.

It is to be noted that there may be bonded to the metallic wall of the reservoir for cryogenic liquids one or more thicknesses of sheets or shells of rigid cellular foam, so as to produce the desired thickness of foam for obtaining the desired degree of insulation.

What I claim is:

1. An insulated container for cryogenic liquids, such as liquid hydrogen, liquid oxygen, liquid methane, comprising a rigid shell and an insulating layer set on the outer surface of the shell and formed from gas-impermeable foamed plastic protecting said outer surface from cryopumping atmospheric gases, said foamed plastic consisting essentially of polyvinyl chloride, a copolymer of a vinylidene monomer and an ethylenically unsaturated carboxylic acid anhydride and a polyisocyanate having at least two —N=C=O groups per molecule.

2. An insulated container as claimed in claim 1, said insulating layer being in the form of a plurality of previously heat-preformed panels bonded together and to said outer surface by means of an adhesive, to form a sleeve about the container.

3. An insulated container as claimed in claim 1, and a layer of an ablation material on the outer side of the foamed plastic.

References Cited

UNITED STATES PATENTS

| | | | |
|---|---|---|---|
| 995,188 | 6/1911 | Seely | 62—529X |
| 2,067,015 | 1/1937 | Munters | 161—43 |
| 2,896,271 | 7/1959 | Kloote et al. | 161—161UX |
| 2,974,496 | 3/1961 | Pastuhov et al. | 62—529X |
| 3,112,624 | 12/1963 | Rill, Jr. | 260—2.5(A) |
| 3,150,796 | 9/1964 | Hocking et al. | 260—2.5(A) |
| 3,200,089 | 8/1965 | Landler et al. | 260—2.5 |
| 3,265,236 | 8/1966 | Gibbon et al. | 161—161X |
| 3,339,780 | 9/1967 | Forman et al. | 161—161X |
| 3,459,628 | 8/1969 | Dixon et al. | 161—161 |

JOHN T. GOOLKASIAN, Primary Examiner

G. W. MOXON II, Assistant Examiner

U.S. Cl. X.R.

62—529; 161—36, 37, 125, 139, 160, 161; 220—9